United States Patent
Gray et al.

(10) Patent No.: US 11,623,690 B2
(45) Date of Patent: Apr. 11, 2023

(54) CROSS MEMBERS ON REAR RAILS IN A UNIBODY TRUCK

(71) Applicant: Ford Global Technologies, LLC, Dearborn, MI (US)

(72) Inventors: Jeffrey Gray, Dearborn, MI (US); Vincent Anthony Chimento, Plymouth, MI (US); Stephen William Gallagher, Bloomfield Hills, MI (US); Jamie Joseph March, Wyandotte, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 17/075,593

(22) Filed: Oct. 20, 2020

(65) Prior Publication Data

US 2022/0119040 A1    Apr. 21, 2022

(51) Int. Cl.
*B62D 21/09* (2006.01)
*B62D 21/03* (2006.01)
*B62D 25/20* (2006.01)
*B62D 33/023* (2006.01)
*B62D 27/02* (2006.01)

(52) U.S. Cl.
CPC ............ *B62D 21/09* (2013.01); *B62D 21/03* (2013.01); *B62D 25/20* (2013.01); *B62D 27/02* (2013.01); *B62D 33/023* (2013.01)

(58) Field of Classification Search
CPC ........ B62D 21/09; B62D 21/03; B62D 25/20; B62D 27/02; B62D 33/023
See application file for complete search history.

(56) References Cited

U.S. PATENT DOCUMENTS

| | | | |
|---|---|---|---|
| 6,702,365 B2 * | 3/2004 | Semple ................. | B62D 33/02 296/183.1 |
| 6,814,397 B2 * | 11/2004 | Henderson ............ | B62D 33/02 296/181.3 |
| 7,380,829 B2 | 6/2008 | Kishima | |
| 7,401,849 B2 | 7/2008 | McClure et al. | |
| 7,766,416 B2 | 8/2010 | McClure et al. | |
| 9,180,745 B1 * | 11/2015 | Courtright ......... | B62D 25/2054 |
| 11,192,587 B2 * | 12/2021 | Heckman .............. | B62D 33/02 |
| 2001/0039712 A1 * | 11/2001 | Ruehl .................... | B62D 21/02 29/469 |
| 2007/0267896 A1 * | 11/2007 | Werner ................. | B62D 33/02 296/203.04 |
| 2011/0298245 A1 * | 12/2011 | Jarocki ................. | B62D 21/03 296/193.07 |

FOREIGN PATENT DOCUMENTS

| | | | | |
|---|---|---|---|---|
| DE | 202015103146 U1 * | 9/2015 | ............ | B60D 1/485 |
| DE | 102017125030 A1 * | 5/2018 | ............ | B62D 21/02 |
| WO | WO-2017040381 A1 * | 3/2017 | ............ | B62D 21/03 |

\* cited by examiner

*Primary Examiner* — Lori L Lyjak
(74) *Attorney, Agent, or Firm* — Vichit Chea; Carlson, Gaskey & Olds P.C.

(57) ABSTRACT

The present disclosure is directed to a truck including a cargo box coupled to a first rail and a second rail with a first cross member and a second cross member. The first and second rail are coupled to, and extend transverse to, the first and second cross members. A bed floor of the cargo box is physically separated from the rails by the cross members.

13 Claims, 6 Drawing Sheets

CROSS MEMBERS ON REAR RAILS IN A UNIBODY TRUCK

BACKGROUND

Technical Field

The present disclosure is directed to a support assembly for a cargo bed of a truck that includes cross-members between the cargo bed and rear frame rails.

Description of the Related Art

Trucks are popular motor vehicles in part because of cargo capacity provided by a box or bed that extends from a passenger cab. The bed includes two side panels, a cab panel or header extend upwardly from the bed, and a tailgate, hinged at a rear edge of the bed. Traditionally, trucks are not unibody structures, such that the cab and the box are separate assemblies. Some box assemblies include frame rails coupled directly to an underside of the bed with a plurality of cross members extending between interior walls of the frame rails.

BRIEF SUMMARY

The present disclosure is directed to a bed of a truck that includes a box floor, a plurality of cross members, and a left and right rear rail where the plurality of cross members are positioned between the rear rails and the box floor. With such a configuration, a height of the rear rails can be reduced, saving on material cost and simplifying assembly. The arrangement of the cross members being between the bed and the rear rails can be incorporated in a unibody truck.

The left and right rear rails are coupled or welded to a bottom surface of the cross members. The box floor is welded to a top surface of the cross members so that the box floor and the rails are physically separated from each other by the cross members. In some arrangements, the cross members are wider than an outermost edge of each of the left and right rear rails.

A truck bed according to the present disclosure may include a bed floor that extends between a first interior panel wall and a second interior panel wall. A first rail is aligned with the first interior panel and a second rail is aligned with the second interior panel. A first cross member extends between the first rail and the second rail from the first interior panel to the second interior panel. The first cross member is between the bed floor, the first interior panel, the second interior panel and the first rail and the second rail.

A first wheel well and a second wheel well may be integrated within the first and second interior panel wall. At least one of the cross members is coupled to, and extends transverse to, the first rail and the second rail and is aligned with the first and second wheel well.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
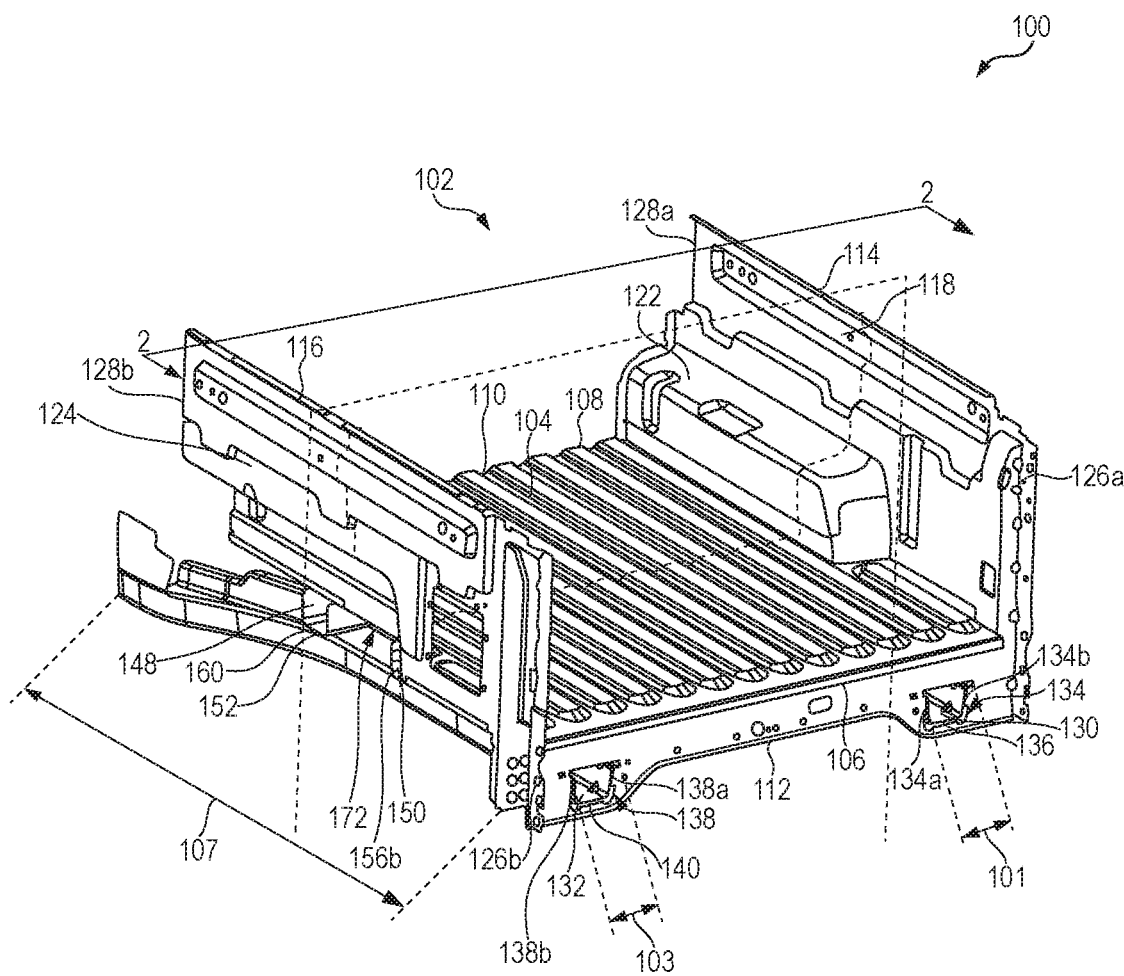
FIG. 1 is a schematic view of a cargo box of a vehicle in which a first cross member and a second cross member couple to a bed floor of the cargo box, and a first rail and a second rail extend transverse to the first cross member and the second cross member, according to an embodiment of the present disclosure.

FIG. 1 is a schematic view of a cargo box or bed 100 of a vehicle 102, which may be a unibody pickup truck. The cargo box 100 includes a bed floor 104 having a front end 106 adjacent to a cab (driver and passenger compartment) and a rear end 108 opposite to the front end 106. A first cross member 148 and a second cross member 150 are positioned between the bed floor 104 and a first rail 130 and a second rail 132.

The bed floor 104 is disposed between a tailgate region 110 and a header region 112. The tailgate is pivotally mounted to the bed floor 104 at the rear end 108 between an open and closed position. The bed floor 104 also supports a first body side panel 114 and a second body side panel 116. The bed floor 104 extends between an interior wall 118 of the first body side panel 114 and an interior wall of the second body side panel 116.

The first body side panel 114 and the second body side panel 116 are secured to the header region 112 of the cargo box 100 at forward box pillar regions 126a, 126b of the cargo box 100. The header 112 runs transverse to the first body side panel 114 and the second body side panel 116 at the front end 106 adjacent to the cab.

Beneath the first body side panel 114 and the second body side panel 116, the first rail 130 and the second rail 132 extend from the front end 106 to the second end 108 and support the cargo box 100. The first rail 130 has a first bottom wall 136, and a first interior wall 134a and a first exterior wall 134b, collectively referred to as a first pair of opposing sidewalls 134. The first exterior wall 134b is adjacent to the first body side panel 114 and runs longitudinally from the header region 112 to the tailgate region 110. The second rail 132 has a second bottom wall 140, and a first interior wall 138a and a second exterior wall 138b, collectively referred to as a second pair of opposing sidewalls 138. The second exterior wall 138b is adjacent to the second body side panel 116 from the header region 112 to the tailgate region 110.

The first interior wall 134a and the first exterior wall 134b are separated by a first dimension 101 at the header region 112. Similarly, the first interior wall 138a and the second exterior wall 138b are separated by a second dimension 103 at the header region 112. The first and second dimension are substantially the same, however there may be tolerance differences based on manufacturing processes.

Figure 4:
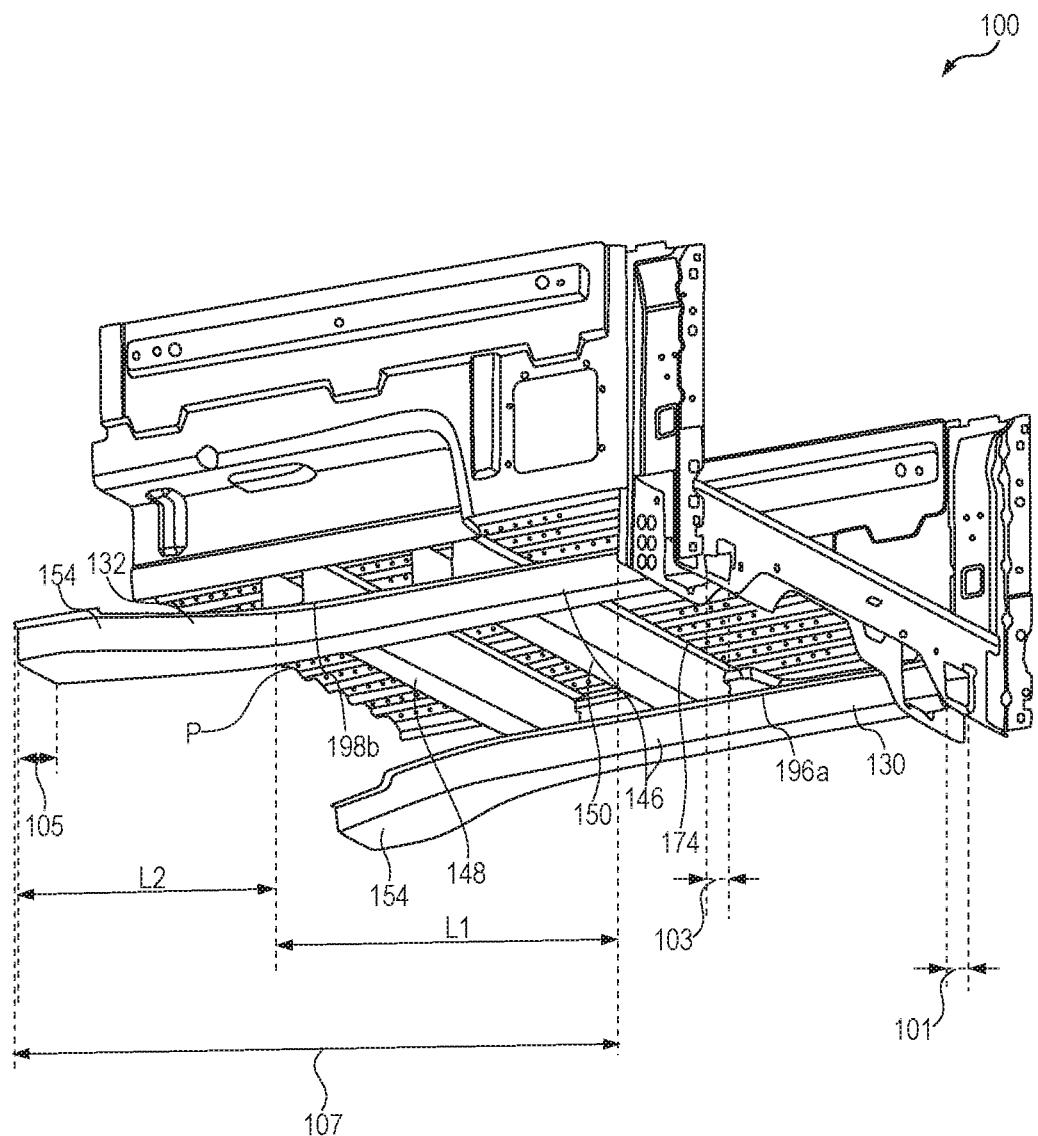
FIG. 4 is a perspective underside view of the cargo box of FIG. 1.

Similar to the first dimension and second dimension 101, 103, each of the first rail 130 and the second rail 132 have an end dimensions 105, see FIG. 4 adjacent to the tailgate in the first direction. The first interior wall 134*a* and the first exterior wall 134*b* are separated by the end dimension 105 at the tailgate region 110. The first interior wall 138*a* and the second exterior wall 138*b* also has an end dimension that is substantially similar to the end dimension 105.

The first rail 130 and the second rail 132 have longitudinal extensions along a second direction that is transverse to the first direction. Each of the first rail 130 and the second rail 132 has a third dimension 107 in the second direction attributed to the longitudinal extensions of the first rail 130 and the second rail 132 between the header region 112 and the tailgate region 110. The first body side panel 114 includes a first wheel well 122 as viewed from inside the cargo box 100 and the second body side panel 116 includes a second wheel well 124 as viewed from outside the cargo box 100

The first cross member 148 and the second cross member 150 extend from outer-most edges of the first wheel well 122 and the second wheel well 124. The first cross member 148 has a first lateral end (not shown) and a second lateral end 152. The first lateral end of the first cross member 148 is secured to the first rail 130 adjacent to the first wheel well 122 and the second lateral end 152 of the first cross member 148 is secured to the second rail 132 adjacent to the second wheel well 124. Similarly, the second cross member 150 has a first lateral end 156*a* (see FIG. 2) and a second lateral end 156*b*. The first lateral end of the second cross member 150 is secured to the first rail 130 and the second lateral end 156*b* of the second cross member 150 is secured to the second rail 132. In other words, the first cross member 148 and the second cross member 150 have linear extensions in the first direction that are transverse to the linear extensions of the first rail 130 and the second rail 132. In one embodiment, the first cross member 148 and the second cross member 150 extend from the first exterior wall 134*b* of the first rail 130 to the second exterior wall 138*b* of the second rail 132.

The first cross member 148 and the second cross member 150 are positioned between the bed floor 104 and the first rail 130 and the second rail 132. A bottom surface 172 of the bed floor 104 abuts or is otherwise coupled, such as by a weld, to the first cross member 148 and the second cross member 150. The first cross member 148 and the second cross member 150 are physically separated from the first rail 130 and the second rail 132 by the first cross member 148 and the second cross member 150.

The first and second cross members 148, 150 are sized for securing to and supporting the bed floor 104 with the first rail 130 and the second rail 132. Each of the first cross member 148 and the second cross member 150 includes a bottom wall 160 that runs horizontally, substantially parallel to the bed floor 104. The bottom wall 160 of the first and second cross member are configured to couple to the first rail 130 and the second rail 132 at the first lateral end and the second lateral end of the cross member. The first cross member 148 and the second cross member 150 may be made up of roll-formed aluminum or other sufficient structural material. Roll-formed cross-members provide longitudinal, one-piece supporting beams that provide support to the bed floor.

Figure 2:
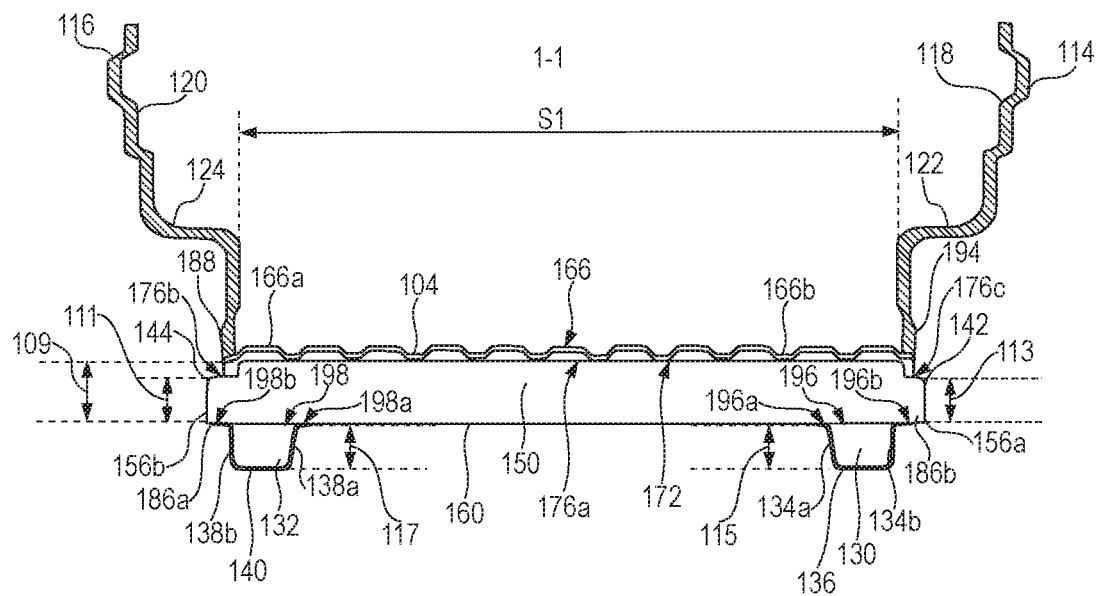
FIG. 2 is a cross-sectional view of the cargo box of FIG. 1 along line 2-2.

FIG. 2 is a cross-sectional view of the cargo box 100 of FIG. 1 along a section line 2-2 through the second cross member 150. The interior wall 118 of the first body side panel 114 and the interior wall 120 of the second body side panel 116 are separated by a distance S1, which is equal to a width of the bed floor 104. A smallest width of the bed floor 104 is between the first wheel well 122 and the second wheel well 124.

The bed floor 104 includes a series of grooves or ridges that form a plurality of peaks 166*a* and a plurality of valleys 166*b* on the bed floor 104. The second cross member 150 is coupled to the bottom surface 172 of the bed floor 104. In one embodiment, the second cross member 150 is coupled to the bottom surface 172 of the bed floor 104 by utilizing a welding process, fasteners, or other suitable adhesives. The second cross member 150 includes a pair of flanges 174 (see FIG. 4) to attach to one or more of the valleys 166*b* in the bed floor 104. Each flange provides an attachment surface to which welding, or fasteners can be employed to couple to the bed floor.

The second cross member 150 includes a first top surface 176*a*, a second top surface 176*b*, and a third top surface 176*c*. The first top surface 176*a* is the broadest middle region from which each of the flanges 174 extend. The first top surface 176*a* is separated from the bottom wall 160 of the second cross member 150 by a first dimension 109 in a third direction that is transverse to the first and second direction. The first dimension 109 is a largest height of the second cross member 150.

The second top surface 176*b* is a narrow region of each of the flanges 174 of the second cross member 150 that is adjacent to the second body side panel 116. The second top surface 176*b* is separated from the bottom wall 160 of the second cross member 150 by a second dimension 111 in the third direction. In one embodiment, the second dimension 111 is smaller than the first dimension 109. Thus, the second top surface 176*b* forms a first notch 186*a* adjacent to the second lateral end 156*b* at the second cross member 150 that extends toward a lower edge 188 of the second body side panel 116. The first notch 186*a* is configured to align with the second exterior wall 138*b* of the second rail 132.

The third top surface 176*c* is another narrow region of each of the flanges 174 of the second cross member 150 that is adjacent to the first body side panel 114. The third top surface 176*c* is separated from the bottom wall 160 of the second cross member 150 by a third dimension 113 in the third direction.

In one embodiment, the third dimension 113 is smaller than the first dimension 109. Thus, the third top surface 176*c* forms a second notch 186*b* adjacent to a first lateral end 156*a* at the second cross member 150 that extends towards a lower edge 194 of the first body side panel 114. The second notch 186*b* is configured to align with the first exterior wall 134*b* of the first rail 130. The third dimension 113 is substantially equal to the second dimension 111. Alternatively, the second and third dimension 111, 113 may be equal to the first dimension 109 such that the height of the second cross member 150 is uniform throughout a length from rail to rail.

The first rail 130 and the second rail 132 are coupled to the bottom wall 160 of the second cross member 150. The first rail 130 includes a first top surface and a second top surface, i.e. a first pair of rail flanges 196 having a first rail flange 196*a* and a second rail flange 196*b*. Similarly, the second rail 132 also includes a first top surface and a second top surface, which are a second pair of rail flanges 198 having a first rail flange 198*a* and a second rail flange 198*b*.

The first pair of rail flanges 196 is spaced from and substantially parallel to the first bottom wall 136 of the first rail 130. The first rail flange 196*a* extends from the first interior wall 134a towards the second rail 132 substantially perpendicularly or transverse to the first interior wall 134a. The second rail flange 196b extends from the first exterior wall 134b towards the first body side panel 114 substantially perpendicularly or transverse to the first exterior wall 134b.

The second pair of rail flanges 198 is spaced from and substantially parallel to the second bottom wall 140 of the second rail 132. The first rail flange 198a extends from the first interior wall 138a towards the first rail 130 substantially perpendicularly to the first interior wall 138a. The second rail flange 198b extends from the second exterior wall 138b towards the second body side panel 116 substantially perpendicularly to the second exterior wall 138b.

The first rail flange 196a and the second rail flange 196b of the first rail 130 are separated from the first bottom wall 136 of the first rail 130 by a first dimension 115 that is equal to a height of the first rail 130. The first rail flange 198a and the second rail flange 198b of the second rail 132 are separated from the second bottom wall 140 of the second rail 132 by a second dimension 117 that is equal to a height of the second rail 132. The first dimension 115 is substantially equal to the second dimension 117.

The first pair of rail flanges 196 and the second pair of rail flanges 198 couple the first rail 130 and the second rail 132, respectively, to the bottom wall 160 of the second cross member 150. An exterior-most edge (i.e., the second rail flange 196b) of the first rail 130 may extend past an exterior-most edge 142 (i.e., a first lateral edge) of the second cross member 150. Similarly, an exterior-most edge (i.e., the second rail flange 198b) of the second rail 132 extends past an exterior-most edge 144 (i.e., a second lateral edge) of the second cross member 150. The first pair of rail flanges 196 and the second pair of rail flanges 198 may be attached to the bottom wall 160 of the second cross member 150 by utilizing a welding process, fasteners, or other suitable adhesives.

Figure 3:
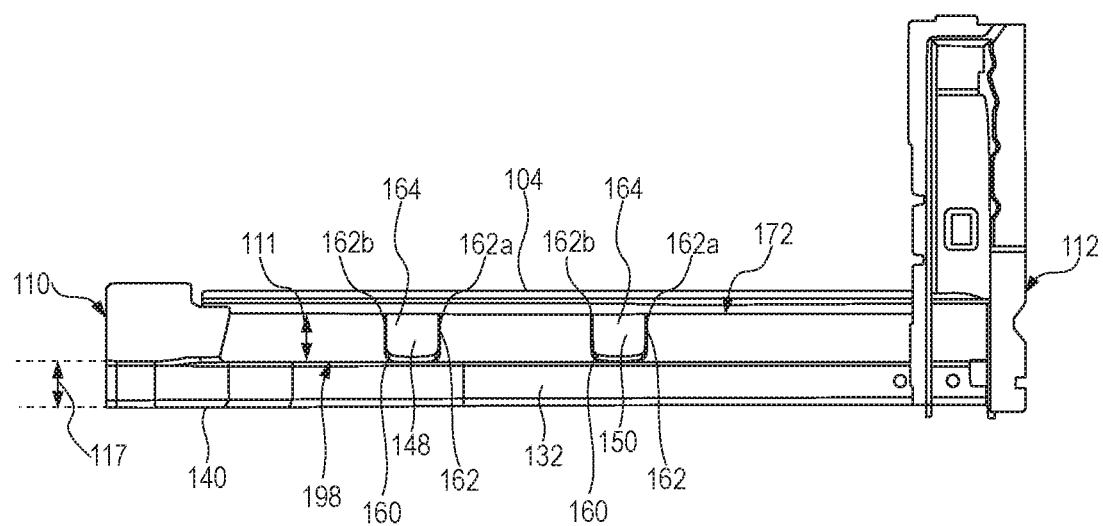
FIG. 3 is a side view of the cargo box of FIG. 1.

FIG. 3 is a simplified side view of the cargo box 100 of FIG. 1 having the first cross member 148 and the second cross member 150 sandwiched between the bottom surface 172 of the bed floor 104 and the second pair of rail flanges 198 of the second rail 132. The first cross member 148 and the second cross member 150 include a cab-side wall 162a and a tailgate-side wall 162b, collectively a pair of opposing sidewalls 162. The pair of opposing sidewalls 162 extends transversely from the bottom wall 160, such as at relative right or obtuse angles (for example, between 90-110 degrees A channel 164 extends within each of the first and second cross members. The channel is within a concave or interior surface of each of the first cross member 148 and the second cross member 150. The second rail 132 extends along the bed floor 104 from the header region 112 to the tailgate region 110. The second dimension 117 of the second rail 132 is smaller than the second dimension 111 of the first cross member 148 and the second cross member 150. In other words, the height of the second rail 132 is less than the height of the first cross member 148 and the second cross member 150. The second dimension 117 may be substantially equal to the second dimension 111.

FIG. 4 is an underside view of the cargo box 100 of FIG. 1. The first rail 130 and the second rail 132 each include a first portion 146 extending from the header region 112 to a point P towards the tailgate region 110. The first portion 146 has a length L1 that is less than the third dimension 107 of the first rail 130 and the second rail 132. The first portion 146 has a width equal to the first dimension 101 throughout the length L1 of the first portion 146. The first cross member 148 and the second cross member 150 are coupled to the first portion 146 of the first rail 130 and the second rail 132 with the first pair of rail flanges 196 of the first rail 130 and the second pair of rail flanges 198 of the second rail 132.

Ends of the first portion 146 of the first rail 130 and the second rail 132 are secured within respective cavities in the header region 112. The ends of the first portion 146 may be welded to, or secured within the cavities by utilizing suitable adhesives.

The first rail 130 and the second rail 132 each also include a second portion 154 extending from the point P to the tailgate region 110. The second portion 154 has a length L2, which is less than the length L1. The second portion 154 has a variable width that increases from the first dimension 101 at the point P to the end dimension 105 at the tailgate region 110. The notches 186a, 186b may be positioned to receive a curvature of the first and second wheel wells.

Figure 5A:
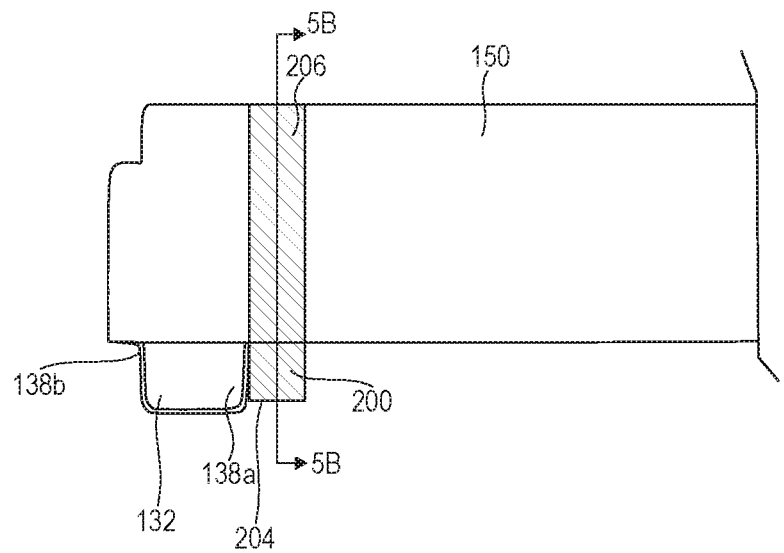
FIG. 5A is a side view of a support member coupled to the second cross member, according to an embodiment of the present disclosure.
Figure 5B:
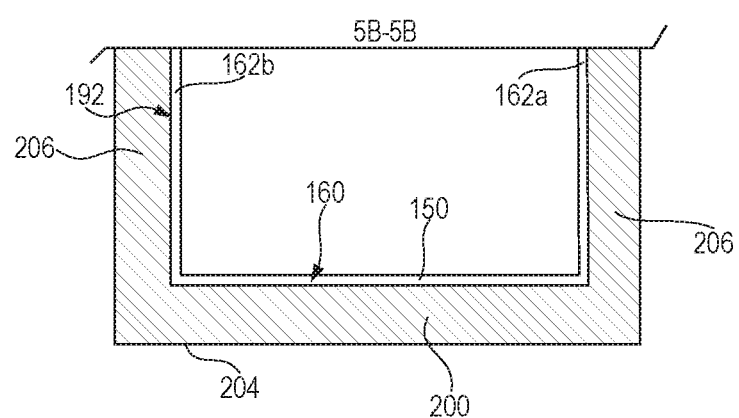
FIG. 5B is a cross-sectional view of the support member coupled to the second cross member and the second rail along the sectional plane 5B-5B, according to an embodiment of the present disclosure.

FIGS. 5A and 5B are side and cross-sectional views of a support member 200 coupled to a cross member of the present disclosure, such as the second cross member 150. The support member 200 is on a surface 192 of the second cross member 150 to provide an additional attachment or coupling surface to a rail, such as rail 132. FIG. 5B is a cross-sectional view of the support member 200 coupled to the surface 192 of the second cross member 150 and the second rail 132 along the sectional plane 5B-5B of FIG. 5A.

The support member 200 includes a base 204 that engages with the bottom wall 160 of the second cross member 150, as shown in FIG. 5A. Sidewalls 206 of the support member 200 also extend from the base 204 at angles like that of the sidewalls 162 extending from the bottom wall 160 of the second cross member 150. The base 204 and the sidewalls 206 are configured to engage with and contact the bottom wall 160 and the sidewalls 162 of the second cross member 150, respectively.

The base 204 may be thicker than the sidewalls 206 to provide additional support beneath the second cross member 150. The base 204 provides a surface to which the rail may be affixed or otherwise coupled, such as by utilizing a welding process, fasteners, or suitable adhesives.

As shown in FIG. 5A, the base 204 of the support member 200 abuts or is in direct contact with the first interior wall 138a of the second rail 132. Such support members may be provided to engage with and contact each rail at opposing sides of the bed. The support member 200 may be made up of extruded aluminum, steel, or other sufficient structural material. In an extrusion process, aluminum in a malleable state can be pushed through a formed shape, such as the shape of the support member, and cut or broken to length.

Figure 6:
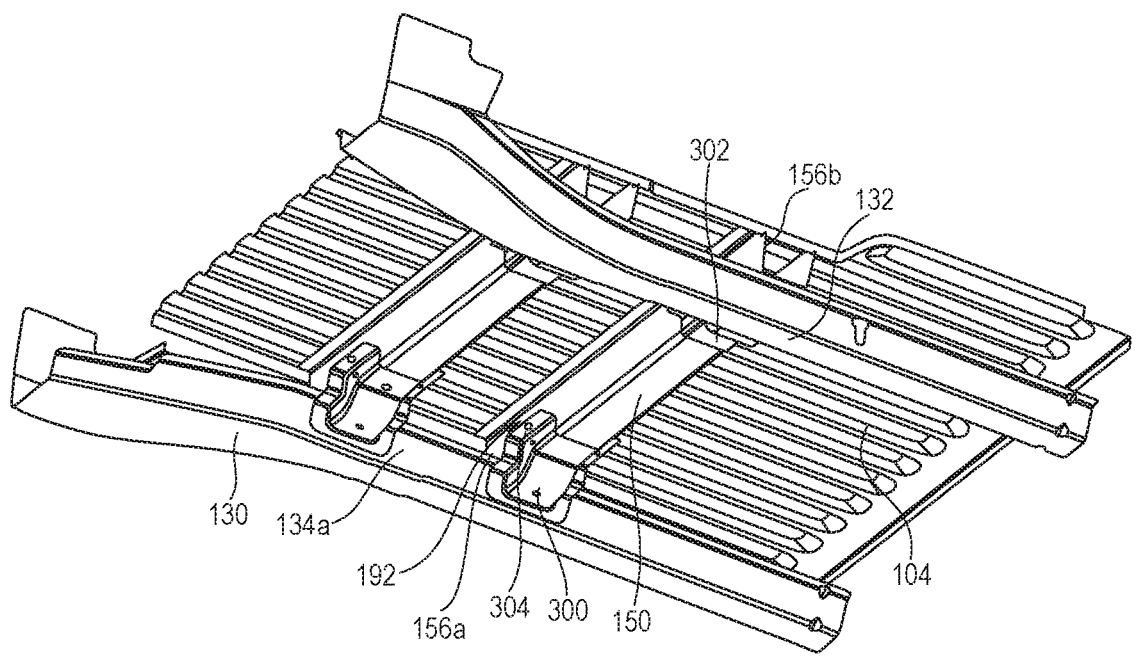
FIG. 6 is an underside view of a cargo box according to an alternative embodiment of the present disclosure.

FIG. 6 is an alternative embodiment of a bed having a plurality of coupling brackets 300, 302 between rails and cross members, which may be similar to the first and second cross members 148, 150. One of the brackets may be coupled between the outside surface 192 of the second cross member 150 and the first interior wall 134a of the first rail 130. The bracket may reinforce the coupling between the second cross member 150 and the first rail 130. The first coupling bracket 300 is coupled to the second cross member 150 adjacent to the first lateral end 156a of the second cross member 150. A second coupling bracket 302 is provided on the outside surface 192 of the second cross member 150 and the first interior wall 138a of the second rail 132. The second coupling bracket 302 is coupled to the second cross member 150 adjacent to the second lateral end 156b of the second cross member 150.

The first coupling bracket 300 includes apertures 304 for securing the first coupling bracket 300 to the second cross member 150 and the first rail 130 using fasteners. Each bracket includes a rail facing flange that is coupled to the rail. The rail facing flanges are extending from a central body that is sized and shaped to contour from the rail facing flange to the snuggly fit around a portion of the bottom surface and sidewalls of the cross member. Along sides of the central body additional flanges extend for coupling to sides of the cross member. These additional flanges could couple to the upper flanges of the cross member that couple to the bed floor. A step or corner shaped flange may be position between the rail facing flange and the additional flanges. The corner shaped flange is coupled to a portion of the central body that is contoured. The first coupling bracket 300, when secured to the second cross member 150 and the first rail 130 may provide additional support to the bed floor 104.

A vehicle comprises a bed floor, a first interior panel wall, a second interior panel wall. The bed floor extends between the first and the second interior panel walls. The vehicle comprises a first rail, a second rail, and a first cross member that extends between the first and the second rail. The first cross member is between the bed floor and the first and second rail.

The first cross member of the vehicle includes a bottom surface, a first top surface spaced from the bottom surface by a first dimension in a first direction, a second top surface spaced from the bottom surface by a second dimension in the first direction. The second dimension is smaller than the first dimension.

The first cross member of the vehicle includes a third top surface spaced from the bottom surface by a third dimension in the first direction. The third dimension is smaller than the first dimension.

The first rail of the vehicle includes a first and second top surface that are welded to the bottom surface of the first cross member.

The first rail of the vehicle includes a bottom surface that is spaced from the first top surface of the first rail by a first dimension. The first cross member includes a second dimension between a top and a bottom surface of the first cross member.

The second dimension is substantially equal to the first dimension.

The second dimension is greater than the first dimension.

The vehicle further includes a cab, a tailgate. The first rail has a first dimension in a first direction adjacent to the cab and a second dimension in the first direction adjacent to the tailgate. The first dimension is smaller than the second dimension.

The vehicle further comprises a second cross member. The first rail has a third dimension in a second direction that is transverse to the first direction. A first portion of the first rail has the first dimension. The first and second cross members are coupled to the first portion of the first rail.

A unibody truck comprises a cab, a tailgate, a bed that extends between the cab and the tailgate, a first panel having a first wheel well, a second panel having a second wheel well, a first rail that extends from the cab to the tailgate, a second rail that extends from the cab to the tailgate, and a first cross member coupled to and extending transverse to the first and second rail. The first cross member is between the first rail and the bed.

The unibody truck further comprises a second cross member. The first and second cross members extend between the first and the second wheel wells.

The first and second cross members of the unibody truck are elongate, linear rails coupled between the bed and the first and second rails.

The first cross member of the unibody truck is coupled to a top surface of the first rail and to a top surface of the second rail. The second cross member is coupled to the top surface of the first rail and to the top surface of the second rail.

The top surface of the first rail of the unibody truck is spaced from a bottom surface of the bed by a distance.

The bed of the unibody truck includes a plurality of peaks and valleys. The first cross member is coupled to ones of the valleys.

The unibody truck further comprises a first coupling support coupled to the first cross member and to the first rail and a second coupling support coupled to the first cross member and the second rail.

A vehicle comprises a unibody truck that includes a bed having a bottom surface, a first rail and a second rail. The bed extends between the first and second rail. The unibody truck comprises a first cross member that extends between a top surface of the first rail and the bottom surface of the bed, and a second cross member that extends between the top surface of the first rail and the bottom surface of the bed.

The first cross member of the vehicle has a first end coupled to the first rail and a second end coupled to the second rail, and the second cross member has a first end coupled to the first rail and a second end coupled to the second rail.

An exterior-most edge of the first rail of the vehicle extends past an exterior-most edge of the first cross member.

The first and second rails of the vehicle have linear extensions along a first direction, and the first and second cross members have linear extensions along a second direction that is transverse to the first direction.

The unibody truck includes a cab and a tailgate. The first rail has an interior wall, an exterior wall, a bottom wall, and a space between the interior and exterior walls. The first cross member includes a cab-side wall, a tailgate-side wall, and a bottom wall.

A coupling surface of the interior wall of the first rail of the vehicle is coupled to the bottom wall of the first cross member, a coupling surface of the exterior wall of the first rail is coupled to the bottom wall of the first cross member.

The second rail of the vehicle has an interior wall, an exterior wall, a bottom wall, and a space between the interior and exterior walls. The first cross member extends from the exterior wall of the first rail at least to the exterior wall of the second rail.

The first cross member of the vehicle includes a first notch aligned with the exterior wall of the first rail and a second notch aligned with the exterior wall of the second rail.

The unibody truck includes a first interior panel and a second interior panel. A lower edge of the first interior panel is in the first notch of the first cross member.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
   a bed floor;
   a first interior panel wall;
   a second interior panel wall, the bed floor extending between the first interior panel wall and the second interior panel wall;
   a first rail;
   a second rail;
   a first cross member that extends between the first rail and the second rail, the first cross member being sandwiched between the bed floor and the first rail and the second rail; and
   a second cross member that extends between the first rail and the second rail, the second cross member being sandwiched between the bed floor and the first rail and the second rail,
   wherein the second cross member includes:
   a bottom wall;
   a first top surface spaced from the bottom wall by a first dimension in a first direction; and
   a second top surface spaced from the bottom wall by a second dimension in the first direction, the second dimension being smaller than the first dimension.

2. The vehicle of claim 1 wherein the second cross member includes a third top surface spaced from the bottom wall by a third dimension in the first direction, the third dimension being smaller than the first dimension.

3. A vehicle, comprising:
   a bed floor;
   a first interior panel wall;
   a second interior panel wall, the bed floor extending between the first interior panel wall and the second interior panel wall;
   a first rail;
   a second rail;
   a first cross member that extends between the first rail and the second rail, the first cross member being between the bed floor and the first rail and the second rail; and
   a second cross member that extends between the first rail and the second rail, the second cross member being between the bed floor and the first rail and the second rail,
   wherein the first rail includes first and second top surfaces that are welded to a bottom wall of the second cross member.

4. The vehicle of claim 3 wherein the first rail includes a bottom wall that is spaced from the first top surface of the first rail by a first dimension, wherein the second cross member includes a second dimension between a top and the bottom wall of the first cross member.

5. The vehicle of claim 4 wherein the second dimension is substantially equal to the first dimension.

6. The vehicle of claim 4 wherein the second dimension is greater than the first dimension.

7. The vehicle of claim 1, wherein:
   the first rail includes a first dimension in a first direction adjacent to a header region of the bed floor and a second dimension in the first direction adjacent to a tailgate region of the bed floor, the first dimension being smaller than the second dimension; and the first rail having a third dimension in a second direction that is transverse to the first direction, a first portion of the first rail having the first dimension, wherein the first and second cross members are coupled to the first portion of the first rail.

8. A vehicle, comprising:
   a unibody truck that includes:
   a bed having a bottom surface;
   a first rail and a second rail, the bed extending between the first and second rail;
   a first cross member sandwiched between a top surface of the first rail and the bottom surface of the bed; and
   a second cross member sandwiched between the top surface of the first rail and the bottom surface of the bed,
   wherein the first cross member has a first end coupled to the first rail and a second end coupled to the second rail, and the second cross member has a first end coupled to the first rail and a second end coupled to the second rail, and an exterior-most edge of the first rail extends past an exterior-most edge of the first cross member.

9. The vehicle of claim 8 wherein the first and second rails have linear extensions along a first direction and the first and second cross members have linear extensions along a second direction that is transverse to the first direction.

10. The vehicle of claim 8 wherein the first rail has an interior wall, an exterior wall, a bottom wall, and a space between the interior and exterior walls, wherein the first cross member includes a cab-side wall, a tailgate-side wall, and a bottom wall, and a coupling surface of the interior wall of the first rail is coupled to the bottom wall of the first cross member, and a coupling surface of the exterior wall of the first rail is coupled to the bottom wall of the first cross member.

11. The vehicle of claim 10 wherein the second rail has an interior wall, an exterior wall, a bottom wall, and a space between the interior and exterior walls, the first cross member extending from the exterior wall of the first rail at least to the exterior wall of the second rail.

12. The vehicle of claim 10 wherein the second cross member includes a first notch aligned with the exterior wall of the first rail and a second notch aligned with the exterior wall of the second rail.

13. The vehicle of claim 12 wherein the unibody truck includes a first interior panel and a second interior panel, wherein a lower edge of the first interior panel is in the first notch of the second cross member.

* * * * *